(12) United States Patent
Hill et al.

(10) Patent No.: US 10,119,563 B2
(45) Date of Patent: Nov. 6, 2018

(54) OFFSET BUSHING AND METHOD OF USE

(71) Applicant: The Boeing Company, Chicago, IL (US)

(72) Inventors: Robert G. Hill, Everett, WA (US); James R. Schnelz, Seattle, WA (US); Monte D. Wright, Kenmore, WA (US)

(73) Assignee: The Boeing Company, Chicago, IL (US)

( * ) Notice: Subject to any disclaimer, the term of this patent is extended or adjusted under 35 U.S.C. 154(b) by 625 days.

(21) Appl. No.: 14/678,930

(22) Filed: Apr. 4, 2015

(65) Prior Publication Data

US 2016/0290391 A1 Oct. 6, 2016

(51) Int. Cl.
| | |
|---|---|
| *F16C 17/12* | (2006.01) |
| *B64D 27/26* | (2006.01) |
| *F16C 35/02* | (2006.01) |
| *F16C 11/04* | (2006.01) |
| *F16C 17/02* | (2006.01) |
| *F16C 7/02* | (2006.01) |

(52) U.S. Cl.
CPC .............. *F16C 17/12* (2013.01); *B64D 27/26* (2013.01); *F16C 11/045* (2013.01); *F16C 17/02* (2013.01); *F16C 35/02* (2013.01); *B64D 2027/262* (2013.01); *F16C 7/02* (2013.01); *F16C 2326/43* (2013.01)

(58) Field of Classification Search
CPC .......... F16C 17/12; F16C 35/02; F16C 17/02; F16C 11/045; F16C 2326/43; F16C 7/02; B64D 27/26; B64D 2027/262; Y10T 29/49771
See application file for complete search history.

(56) References Cited

U.S. PATENT DOCUMENTS

| | | | |
|---|---|---|---|
| 5,467,941 A | 11/1995 | Chee | |
| 7,406,777 B2 | 8/2008 | Grover et al. | |
| 8,491,587 B2 | 7/2013 | McGovern et al. | |
| 2005/0117966 A1* | 6/2005 | Steinbeck | F16B 5/025 403/408.1 |
| 2006/0200163 A1* | 9/2006 | Roger | A61B 17/155 606/89 |

* cited by examiner

*Primary Examiner* — John C Hong

(57) ABSTRACT

An offset bushing for a structural member may include a tubular body having a cylindrical inner surface and a cylindrical outer surface. The cylindrical inner surface may have an inner diameter defining an inner axis. The cylindrical outer surface may have an outer diameter defining an outer axis. The inner axis may be spaced apart from the outer axis to define a linear offset. The offset bushing may include a bushing indexing feature configured to align with a member indexing feature of a member when the offset bushing is installed in a member bore. Alignment of the bushing indexing feature with the member indexing feature may cause the linear offset to be oriented substantially parallel to a loading axis of a load on the member.

20 Claims, 11 Drawing Sheets

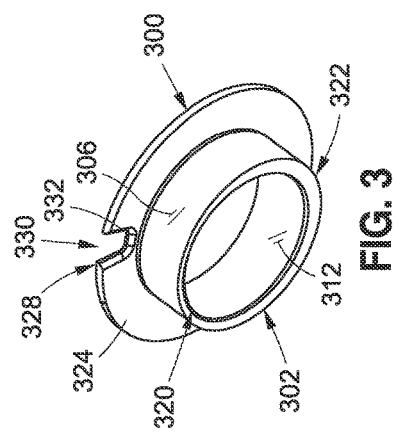
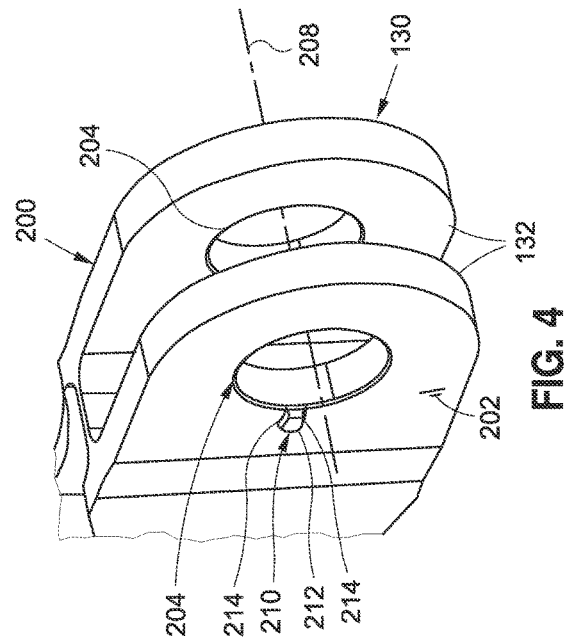
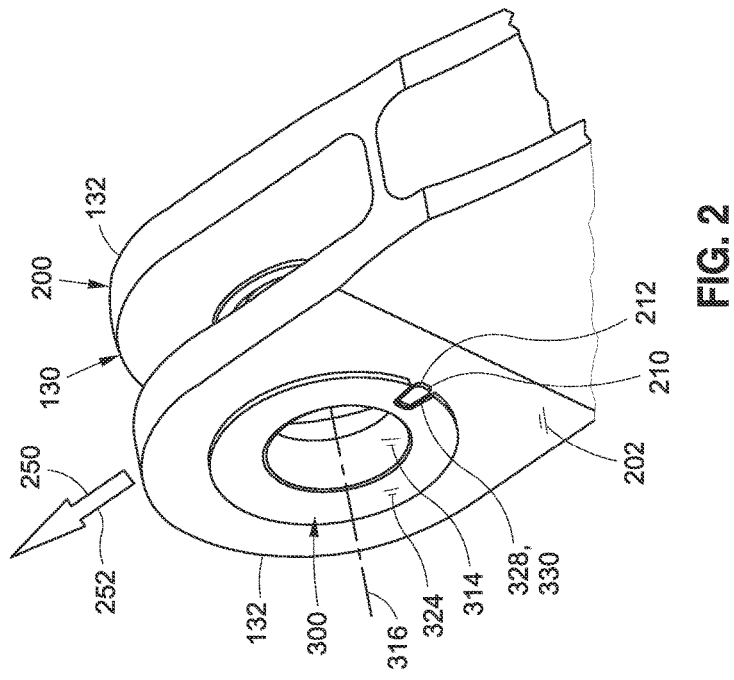
FIG. 3
FIG. 4
FIG. 2

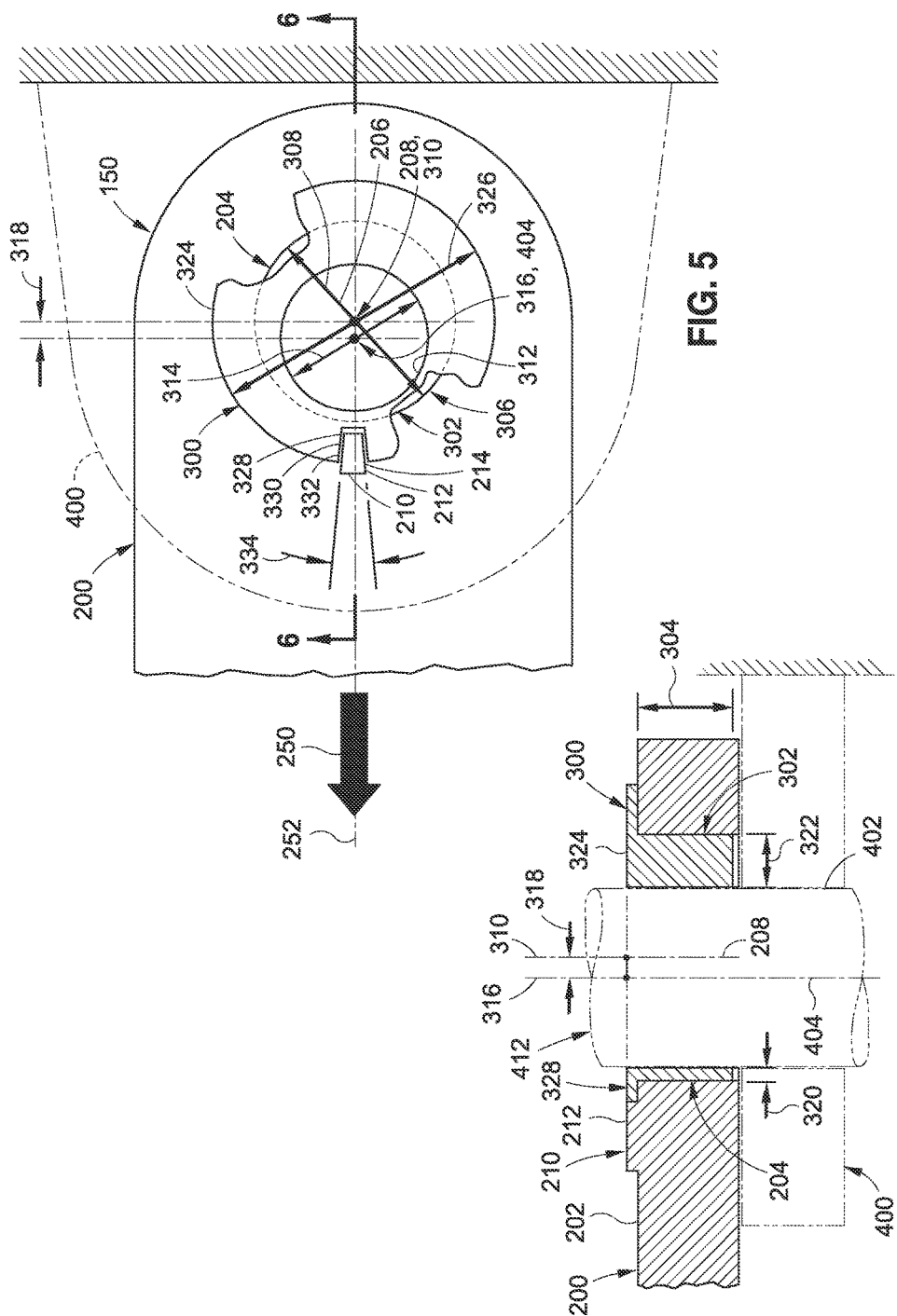

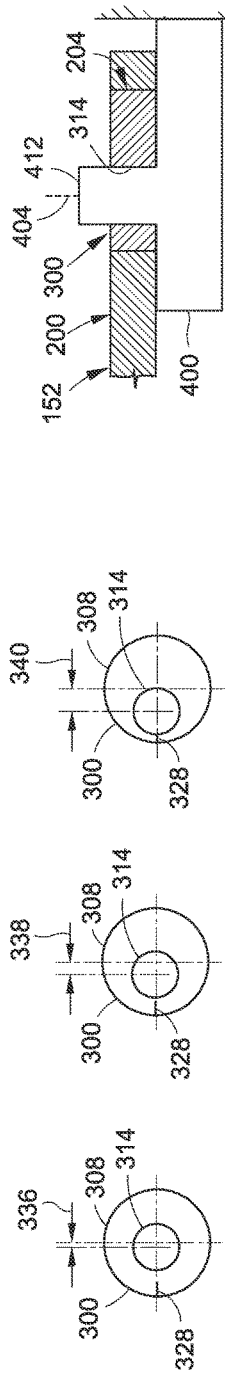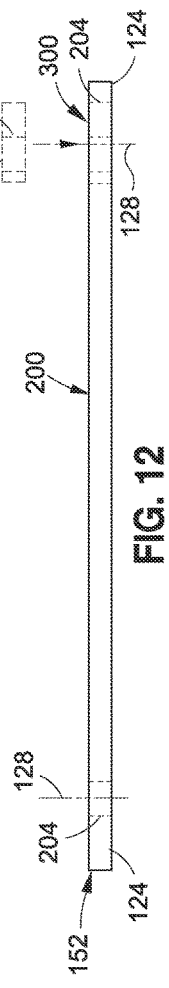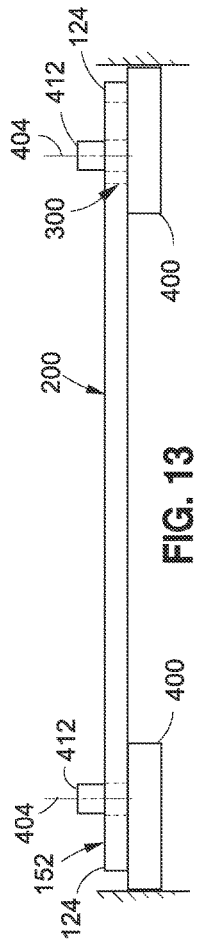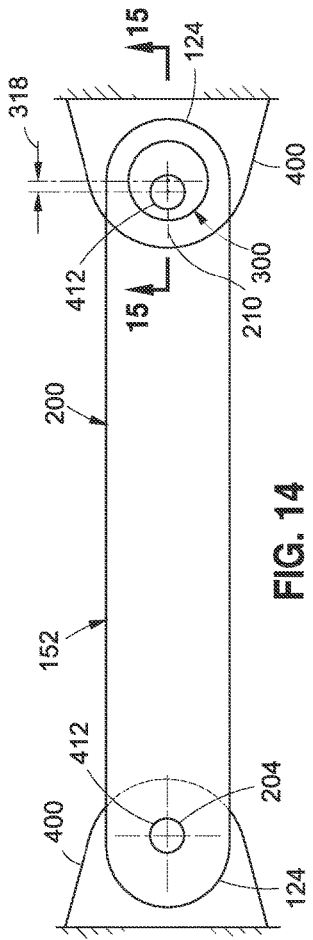

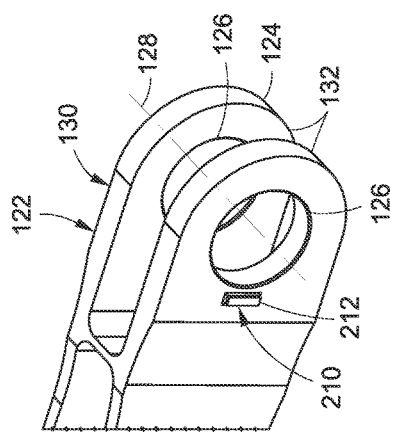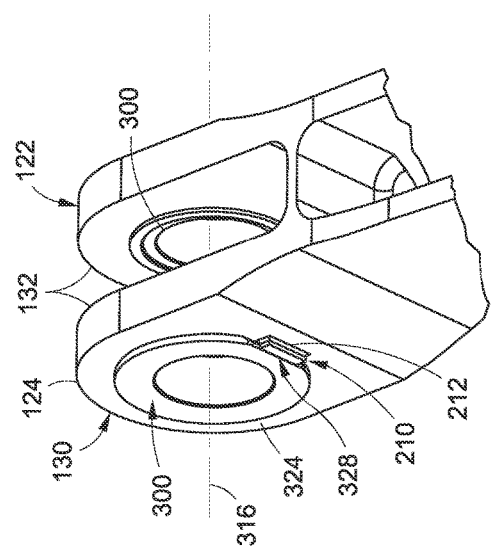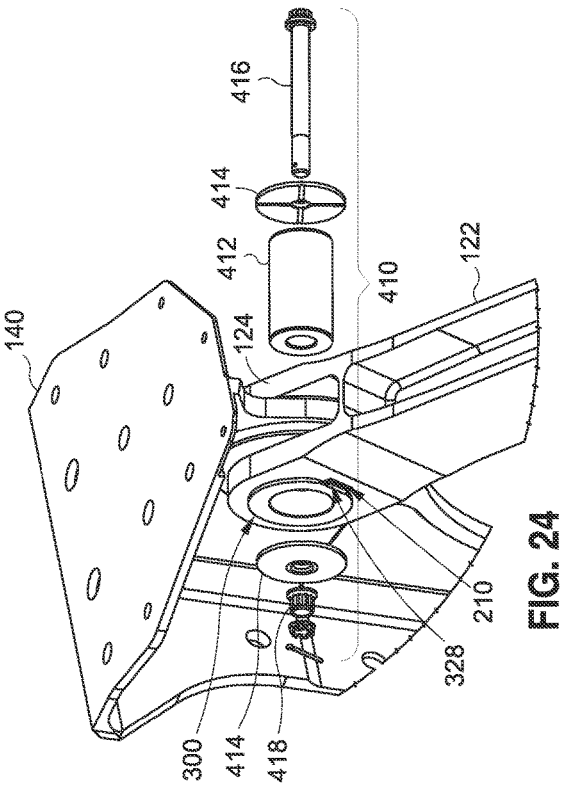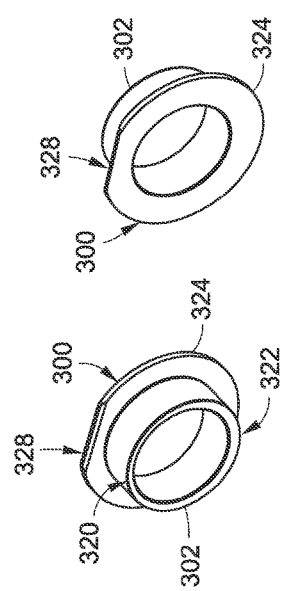

| OFFSET BUSHING PART NO. | LINEAR OFFSET, 318 (± 0.0010 INCH) |
|---|---|
| -1 | 0.0000 |
| -2 | 0.0200 |
| -3 | -0.0200 |
| -4 | 0.0400 |
| -5 | -0.0400 |
| -6 | 0.0600 |
| -7 | -0.0600 |
| -8 | 0.0800 |
| -9 | -0.0800 |

OFFSET BUSHING AND METHOD OF USE

FIELD

The present disclosure relates generally to the assembly of structures and, more particularly, to the use of fastened or pinned joints for connecting structural members.

BACKGROUND

The assembly of certain structures requires the ability to adjust the length of one or more structural members to accommodate manufacturing and assembly variations and thereby allow the members to be connected to mating structures. For example, the propulsion units (e.g., the gas turbine engines) of a commercial aircraft may be attached to the wings by means of nacelle struts. Each nacelle strut-to-wing installation may involve the use of a diagonal brace and a collection of links to pin the nacelle strut to the wing. Each link has opposing ends with a link bore in each end. A first upper link may initially be installed to connect a strut fitting on the top of the nacelle strut to a wing fitting on the wing front spar. The diagonal brace may then be installed to connect a strut fitting on the lower aft end of the nacelle strut to a nacelle support fitting on the lower surface of the wing. A preload may be applied to the nacelle strut to adjust the distance between the strut fitting and the wing fitting to match the center-to-center distance between the pin bores of the diagonal brace such that pins may be inserted into the pin bores to couple the diagonal brace to the fittings.

The installation of the first upper link and the diagonal brace results in a highly rigid system. Unfortunately, the high rigidity of the system complicates the installation of the second upper link. Because of the above-mentioned manufacturing and assembly variations and because of loads on the system, the center-to-center distance between the pin bores of the second upper link may not be the same length as the center-to-center distance between the strut fitting and the wing fitting. The mismatch in the center-to-center distance of the second upper link relative to the strut-to-wing center-to-center distance may prevent the installation of pins into the corresponding bores of the link and the strut and wing fittings. The high rigidity of the system may prevent further preload on the nacelle strut to adjust the center-to-center distance between the strut fitting and the wing fitting to allow the second upper link to be installed.

As can be seen, there exists a need in the art for a means for providing adjustability in the connection of a structural member to a mating structure. For example, there exists a need in the art for a means for adjusting the center-to-center distance between the bores in opposite ends of a structural member so that the structural member may be attached to the mating structure at each end of the structural member.

SUMMARY

The above-noted needs associated with the adjustability of a structural member for connection to a mating structure are specifically addressed and alleviated by the present disclosure which provides an offset bushing for a structural member. The offset bushing may include a tubular body having a cylindrical inner surface and a cylindrical outer surface. The cylindrical inner surface may have an inner diameter defining an inner axis. The cylindrical outer surface may have an outer diameter defining an outer axis. The inner axis may be spaced apart from the outer axis to define a linear offset. The offset bushing may include a bushing indexing feature configured to align with a member indexing feature of a member when the offset bushing is installed in a member bore. The alignment of the bushing indexing feature with the member indexing feature may cause the linear offset to be oriented substantially parallel to a loading axis of a load on the member.

Also disclosed is a method of attaching a structural member to a mating structure. The method may include providing an offset bushing having a tubular body including a cylindrical inner surface and a cylindrical outer surface. The cylindrical inner surface may have an inner diameter defining an inner axis. The cylindrical outer surface may have an outer diameter defining an outer axis. The inner axis may be spaced apart from the outer axis to define a linear offset. The method may further include installing the offset bushing in a member bore of a member having a member indexing feature. The member bore may have a member bore axis. The method may additionally include angularly aligning the member indexing feature with the bushing indexing feature causing the linear offset to be substantially parallel to a loading axis of the member.

In a further embodiment, disclosed is a method of attaching a nacelle strut to a wing. The method may include providing a link for coupling the wing fitting to the strut fitting. The link may have opposing link ends each having a link bore. The method may additionally include providing a series of offset bushings each having a linear offset between an inner axis and an outer axis of a respective inner and an outer diameter. The offset bushings in the series may have different linear offsets. The method may further include measuring a center-to-center distance between a wing fitting on the wing and a strut fitting on the nacelle strut, and measuring a center-to-center distance between the link ends of the link. The method may also include selecting for installation into a link bore the offset bushing that results in a center-to-center distance between the link ends that most closely matches the center-to-center distance between the wing fitting and the strut fitting. The method may additionally include installing the offset bushing into at least one link bore of the link, and angularly aligning the member indexing feature with the bushing indexing feature causing the linear offset to be substantially parallel to a loading axis of the link. The method may further include installing the link between the wing fitting and the strut fitting.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 2 is a perspective view of an example of an offset bushing installed in a structural member and illustrating an example of a bushing indexing feature engaged with a member indexing feature;

FIG. 3 is a perspective view of the offset bushing of FIG. 2 and illustrating an example of a bushing indexing feature configured as a notch formed in a flange of the offset bushing;

FIG. 4 is a perspective view of the structural member of FIG. 2 and illustrating an example of a member indexing feature configured as a tab formed on a member side surface of the member;

FIG. 5 is a plan view of an example of an offset bushing installed in a structural member and illustrating the linear offset between the inner axis of the inner diameter and the outer axis of the outer diameter;

FIG. 6 is a cross-sectional view of the offset bushing taken along line 6 of FIG. 5 and illustrating the linear offset;

FIGS. 11A-11C are top views of examples of a series of offset bushing each having substantially the same geometry with the exception that each offset bushing has a different linear offset;

FIG. 12 is a side view of the link of FIG. 8 and illustrating the installation of an offset bushing in the right-hand link end;

FIG. 13 is a side view of the link interconnecting the two mating structures shown in FIG. 9;

FIG. 14 is a top view of the link interconnecting the mating structures;

FIG. 15 is a sectional view taken along line 15 of FIG. 14 and illustrating a pin of the right-hand mating structure extending through the inner diameter of the offset bushing installed within the member bore of the right-hand end of the link;

FIG. 20 is a magnified perspective view of an example of an upper link end of a link of FIG. 18 and illustrating a pair of offset bushings installed in a corresponding pair of lugs of the link end;

FIG. 21 is a perspective view of the link end of FIG. 20 with the offset bushing omitted and illustrating an example of a member indexing feature of the link;

FIG. 22 is a perspective view of one side of an example of an offset bushing as may be installed in the link end of the link shown in FIG. 21 and illustrating the bushing indexing feature for engaging the member indexing feature shown in FIG. 21;

FIG. 23 is a perspective view of an opposite side of the offset bushing of FIG. 22;

FIG. 24 is an exploded view of an example of a pin assembly for connecting the link to the wing fitting of FIG. 18;

DETAILED DESCRIPTION

Figure 1:
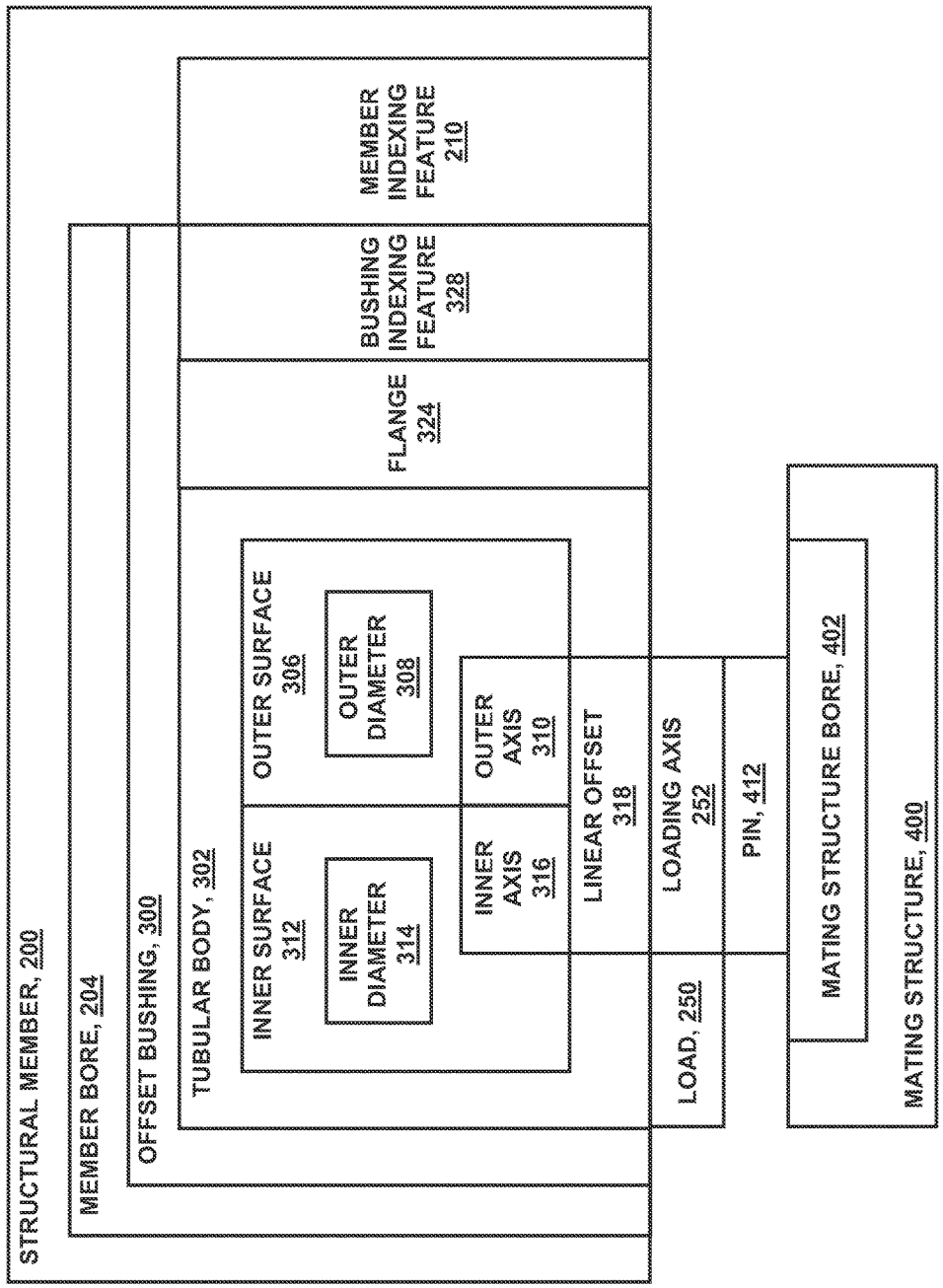
FIG. 1 is a block diagram of a structural member having an offset bushing installed in a member bore and wherein an inner and outer diameter of the offset busing respectively have inner and outer axes that are spaced apart to define a linear offset, the offset bushing further including a bushing indexing feature configured to be aligned with a member indexing fixture of the member causing the linear offset of the offset bushing to be aligned with a loading axis of a load that may be placed on the structural member.

Referring now to the drawings which are provided for purposes of illustrating various embodiments of the present disclosure, shown in FIG. 1 is a block diagram of a structural member 200 which may have an offset bushing 300 installed in a member bore 204 of the member 200. The offset bushing 300 may include a tubular body 302 having a cylindrical inner surface 312 and a cylindrical outer surface 306. The cylindrical inner surface 312 may have an inner diameter 314 defining an inner axis 316. The cylindrical outer surface 306 may have an outer diameter 308 defining an outer axis 310. The outer diameter 308 may be sized complementary to the diameter 206 (FIG. 5) of the member bore 204. The inner axis 316 (i.e., the center of the inner diameter 314) may be spaced apart from the outer axis 310 (i.e., the center of the outer diameter 308) to define a linear offset 318. Due to the linear offset 318, the outer diameter 308 is non-concentric with the inner diameter 314.

The offset bushing 300 may include a bushing indexing feature 328. In some examples, the bushing indexing feature 328 may be included in a flange 324 of the offset bushing 300. The member 200 may include a member indexing feature 210. The bushing indexing feature 328 may be sized, configured, arranged, and/or located complementary to the member indexing feature 210 in a manner such that when the offset bushing 300 is installed in the member bore 204 and the bushing indexing feature 328 is aligned with, engaged with, or otherwise corresponds to the member indexing feature 210, the direction of the linear offset 318 may be substantially parallel to (e.g., within 5 degrees) a loading axis 252 of a load 250 on the member 200. The load 250 may be a primary load that may act on the member 200 along the loading axis 252 such as when the member 200 is in service. An example of a primary load on a member 200 may be a tension load or a compression load acting along the loading axis 252.

FIG. 2 is a perspective view of an example of an offset bushing 300 installed in a structural member 200 and illustrating an example of a bushing indexing feature 328 engaged with a member indexing feature 210. FIG. 3 is a perspective view of the offset bushing 300 of FIG. 2 removed from the member 200 to illustrate an example of a bushing indexing feature 328 configured as a notch 330 formed in a flange 324 of the offset bushing 300. FIG. 4 is a perspective view of the structural member 200 of FIG. 2 with the offset bushing 300 omitted to illustrate an example of a member indexing feature 210 configured as a tab 212 formed on a member side surface 202 of the member 200 for engaging the notch 330 in the offset bushing 300 (see FIG. 3).

FIG. 3 illustrates the tubular body 302 of the offset bushing 300 having a cylindrical outer surface 306 having an outer diameter 308 (see FIG. 5). The cylindrical inner surface 312 has an inner diameter 314 (see FIG. 5). Due to the linear offset 318 (see FIG. 5) of the outer diameter 308 relative to the inner diameter 314, the tubular body 302 has a minimum wall thickness 320 and a maximum wall thickness 322. In some example, the minimum wall thickness 320 may be located on a diametrically opposite side of the tubular body 302 from the maximum wall thickness 322. However, in other examples not shown, the tubular body 302 may be configured such that the minimum wall thickness 320 and the maximum wall thickness 322 are not necessarily located on diametrically opposite sides of the tubular body 302. In some examples, the offset bushing 300 may be formed of metallic material including, but not limited to, steel or titanium. In other examples, the offset bushing 300 may be formed of non-metallic material such as ceramic material, polymeric material including fiber reinforced polymer matrix material, or any other type of non-metallic material.

In the example shown, the offset bushing 300 includes a flange 324 on one end of the tubular body 302. The flange 324 is shown as a radial flange 324 having a flange diameter 326 (see FIG. 5). However, the flange 324 may have any one of a variety of profile shapes other than a radial flange 324 having a flange diameter 326. For example, the flange 324 may have the shape of a square, an oval, a series of angularly spaced petals, or any one of a variety of other configurations. Although the offset bushing 300 is shown in FIG. 3 as having a flange 324 on one end of the tubular body 302, the offset bushing 300 may have a flange 324 on each of opposing ends of the tubular body 302. In some examples, the offset bushing 300 may be provided in an embodiment without a flange 324.

In FIGS. 2-3, the flange 324 is shown having the bushing indexing feature 328 positioned at a single radial location on the flange 324. However, the offset bushing 300 may include any number of bushing indexing features 328 at one or more locations on the offset bushing 300. In FIG. 2, the bushing indexing feature 328 is configured as a notch 330 which may be sized and configured to engage a corresponding member indexing feature 210 such as the tab 212 (FIG. 4). The tab 212 may be located on a member side surface 202 of the member 200, as described below. The notch 330 may include notch sides 332 that are sized and configured to engage the tab sides 214 (see FIG. 4) of the tab 212. However, the bushing indexing feature 328 and the member indexing feature 210 may be provided in any size, shape, and configuration, without limitation.

Regardless of its size or shape, the bushing indexing feature 328 may be configured to engage with or may be aligned with or correspond to a member indexing feature 210 in a manner that results in the linear offset 318 (see FIG. 5) being substantially parallel to a loading axis 252 of a load 250 to which the member 200 may be subjected. For examples where the offset bushing 300 lacks one or more flanges 324, it is contemplated that one or more bushing indexing features 328 may be incorporated into one or both ends of the tubular body 302 for alignment with one or more corresponding member indexing features 210 that may be included with the member 200. For example, although not shown, one or more bushing indexing features 328 such as markings may be formed on or into the circular edges or end faces (not shown) at one end or both ends of the tubular body 302 and may be aligned with member indexing features 210 such as markings that may be formed on or into one or more member side surfaces 202.

FIG. 5 is a side view of an offset bushing 300 installed in a structural member 200. The structural member 200 is shown coupled to a mating structure 400. A load 250 is shown applied to the member 200 along a loading axis 252. The member 200 has a member bore 204 into which the offset bushing 300 is installed. The loading axis 252 of the load 250 on the member 200 passes through the inner axis 316. The mating structure 400 may resist the load 250 with a reaction load. The reaction load of the mating structure 400 passes through the member bore axis which is coincident with the outer axis 310 of the outer diameter 308 of the offset bushing 300. The alignment of the linear offset 318 with the loading axis 252 may prevent or reduce eccentric loading of the offset bushing 300 relative to the member bore 204 which may otherwise occur if the inner axis 316 were laterally offset from the member bore axis.

In FIG. 5, the installation of the offset bushing 300 in the structural member 200 facilitates alignment of the linear offset 318 with the loading axis 252. In the example shown, the connection of the structural member 200 to the mating structure 400 may be described as a pinned joint 150 wherein a pin 412 (e.g., FIG. 6) or a fastener (e.g., a bolt—not shown) may be extended through the inner diameter 314 of the offset bushing 300. However, the offset bushing 300 may also be implemented for use in joint configurations other than pinned joints 150. For example, one or more of the offset bushings 300 may be implemented for use in a fixed joint (e.g., a non-movable joint), a multi-fastener joint (not shown), or any other type of joint, without limitation.

In addition, the offset bushing 300 may be installed in any type of member 200, without limitation, and is not limited to installation in a structural member 200 subjected to primary loads. A member 200 containing one or more offset bushings 300 may also be subjected to secondary loads in addition to primary loads. In the present disclosure, a secondary load may be described as a load 250 that has a lower magnitude than a primary load. A secondary load may act along a loading axis 252 that may be different than the loading axis 252 of the primary load. For example, a secondary load may act along a loading axis 252 that is oriented perpendicular to the loading axis 252 of a primary load.

In some examples, a primary load on the member 200 may be a tension limit load. In other examples, a primary load on the member 200 may be a compression limit load. In still other examples, the primary load may be a reversing load such that the member 200 may be subjected to both tension and compression along the same loading axis 252. The tension limit load may be of a higher magnitude than the compression limit load, or the compression limit load may be of a higher magnitude than the tension limit load. In still further examples, the tension limit load and the compression limit load on a member 200 may be of substantially equal magnitude.

As indicated above, the tubular body 302 may have a minimum wall thickness 320 (see FIG. 6) on one side of the tubular body 302 and a maximum wall thickness 322 (see FIG. 6) on a diametrically opposite side of the tubular body 302. The bushing indexing feature 328 and the member indexing feature 210 may be configured such that when the offset bushing 300 is installed in the member bore 204 and the bushing indexing feature 328 is engaged to or otherwise corresponds to the member indexing feature 210, the linear offset 318 may be aligned with the loading axis 252 and the maximum wall thickness 322 (see FIG. 6) may be located on a portion of the member bore 204 that is subjected to a bearing force (not shown) due to a larger of the tension limit load and the compression limit load acting on the member 200. In this regard, the maximum wall thickness 322 (see FIG. 6) may be located on the portion of the member bore 204 that is subjected to the highest bearing force resulting from either the tension limit load or the compression limit load.

For example, FIG. 2 illustrates the notch 330 (e.g., bushing indexing feature 328) engaged with the tab 212 (e.g., member indexing feature 210) resulting in the alignment of the linear offset 318 (see FIG. 5) with the loading axis 252. The member 200 is shown subjected to a tension load which results in a bearing force on the tubular body 302 (see FIG. 3) at the location of maximum wall thickness 322 (see FIG. 6). However, in other examples, engagement or alignment of the bushing indexing feature 328 with the member indexing feature 210 may result in alignment of the linear offset 318 (see FIG. 5) with the loading axis 252 and wherein the minimum wall thickness 320 (see FIG. 6) of the tubular body 302 (see FIG. 6) is located on a portion of the member bore 204 (see FIG. 3) that is subjected to the highest bearing force resulting from the load 250 acting on the member 200. In the present disclosure, the bearing force may be described as compressing the wall thickness of the tubular body 302 (see FIG. 3) against one side of the cylindrical member bore 204 (see FIG. 4).

In some examples, the bushing indexing feature 328 may located in radial alignment with the minimum wall thickness 320 or the maximum wall thickness 322. For example, the bushing indexing feature 328 may be located on the same side of the tubular body 302 as either the minimum wall thickness 320 or the maximum wall thickness 322. FIG. 3 illustrates the bushing indexing feature 328 located on the same side of the tubular body 302 as the minimum wall thickness 320. In this regard, the location of the bushing indexing feature 328 may provide an indication of the location of minimum wall thickness 320 or maximum wall thickness 322, and may thereby function as a visual aid during installation of the offset bushing 300 into a member bore 204 (see FIG. 4).

As indicated above, the bushing indexing feature 328 may be configured to align with and/or engage with a member indexing feature 210 when the offset bushing 300 is installed in a member bore 204, and which may result in the linear offset 318 being oriented substantially parallel to the loading axis 252 (see FIG. 5). However, in other examples, installation of the offset bushing 300 within a member bore 204 may not necessarily require that the bushing indexing feature 328 is aligned with or engaged with the member indexing feature 210 for the linear offset 318 to be oriented parallel to the loading axis 252. For example, the offset bushing 300 may be configured such that the bushing indexing feature 328 is angularly offset (not shown) by a predetermined angle (e.g., 90 degrees) relative to the angular location of the member indexing feature 210 when the offset bushing 300 is installed in the member bore 204 and the linear offset 318 is aligned with the loading axis 252. The bushing indexing feature 328 and the member indexing feature 210 may be configured such that when the offset bushing 300 is installed in the member bore 204, the bushing indexing feature 328 may be configured to be registered with the member indexing feature 210. In still other examples, the bushing indexing feature 328 may be configured to be mated to, mechanically fastened to or coupled with, bonded to, attached to, and/or otherwise correspond to the member indexing feature 210 in a manner such that the direction of the linear offset 318 is substantially parallel to the loading axis 252 of a load 250 on the member 200.

The bushing indexing feature 328 and/or the member indexing feature 210 may comprise temporary features or permanent features. For example, the bushing indexing feature 328 may be provided as a permanent notch 330, as mentioned above (see FIGS. 2-3). In some examples, the notch 330 may have parallel notch sides (not shown) configured complementary to parallel tab sides (not shown) of the tab 212. However, in other examples, the notch 330 may be wedge-shaped (e.g., see FIG. 5) having notch sides 332 that define an included angle 334 (FIG. 5) which may be complementary to an included angle of the tabs sides 214. In some examples, the included angle 334 may be no greater than approximately 60 degrees and, more preferably, no greater than approximately 30 degrees. In one example, the included angle 334 may be approximately 12 degrees (e.g., ±1 degree).

The bushing indexing feature 328 and/or the member indexing feature 210 may be machined, cast, formed, molded, or otherwise provided in the flange 324 of the offset bushing 300. Likewise, the member indexing feature 210 may be provided as a tab 212 or other feature that may be machined into (e.g., see FIG. 4), cast, molded, bonded, fastened, or otherwise included with the member 200. Alternatively, the flange 324 may include a tab (not shown) that may radially protrude from the offset bushing 300 and may be configured to engage with or correspond to a complementary-shaped member indexing feature 210 (e.g., a mating tab formed on the member). Even further, the bushing indexing feature 328 and/or the member indexing feature 210 may be provided as markings (e.g., see FIGS. 8-15). For example, the bushing indexing feature 328 and/or the member indexing feature 210 may be configured as one or more line segments that may be printed, applied, embossed, etched, engraved, bonded to, attached to, or otherwise provided with the respective offset bushing 300 and/or the member 200, and which may be aligned with one another when the offset bushing 300 is installed in the member bore 204 to cause the linear offset 318 to align with the loading axis 252.

In some examples, the alignment or registration of the bushing indexing feature 328 with the member indexing feature 210 may cause the linear offset 318 to be parallel to the loading axis 252 within a relatively small angle, such as within 5 degrees. In other examples, the alignment or registration of the bushing indexing feature 328 with the member indexing feature 210 may cause the linear offset 318 to be parallel to the loading axis 252 within 5 degrees or, more preferably, within 2 degrees. Advantageously, by aligning the linear offset 318 with the loading axis 252, rotational movement of the offset bushing 300 within the member bore 204 may be reduced or prevented. The bushing indexing feature 328 and the member indexing feature 210 may be configured to limit angular misalignment of the orientation of the linear offset 318 with the loading axis 252 to avoid or reduce eccentric loading of the offset bushing 300 that may otherwise occur if the offset bushing 300 were installed with the linear offset 318 oriented non-parallel to the loading axis 252.

FIG. 6 is a cross-sectional view of the offset bushing 300 installed in a member 200 and illustrating the linear offset 318 between the inner axis 316 of the inner diameter 314 (see FIG. 5) and the outer axis 310 of the outer diameter 308 (see FIG. 5). The inner diameter 314 and the outer diameter 308 may be provided in any size. For example, the outer diameter 308 may have a size of up to approximately 3 inches or more. The inner diameter 314 may be sized to provide a minimum wall thickness 320 of at least 0.010 inch and, more preferably, a minimum wall thickness 320 of 0.030 inch. As indicated above, the minimum wall thickness 320 may be located on a side of the tubular body 302 that is diametrically opposite to the location of the maximum wall thickness 322. The inner and outer diameter 308 may be sized to provide a maximum wall thickness 322 that is up to 0.50 inch although the maximum wall thickness 322 may be greater than 0.50 inch. If included with the offset bushing, the flange 324 may be provided as a radial flange 324 having a flange diameter 326 (see FIG. 5) that maybe concentric or non-concentric with the outer diameter 308. In some examples, the flange diameter 326 may be at least 0.010 inch larger than the outer diameter 308 of the tubular body 302. However, the difference between the flange diameter 326 and the outer diameter 308 may be less than 0.010 inch.

The flange 324 may be provided in a flange thickness allowing the manufacturing and/or handling of the flange 324 and/or the tubular body 302 during installation into the member bore 204. For configurations wherein the bushing indexing feature 328 is located on the flange 324, the thickness of the flange 324 may be complementary to the member indexing feature 210 to which the bushing indexing feature 328 may be engaged when the offset bushing 300 is installed into the member bore 204. For example, the height of the tab 212 above the member side surface 202 may be substantially equivalent to the flange thickness. In some examples, the flange 324 may have a thickness of approximately 0.010 inch or larger. In an embodiment, the flange thickness may be up to 0.060 inch. However, the flange 324 may be applied in any flange thickness.

In FIG. 6, the flange 324 may have a flange underside that may be configured to bear against a member side surface 202 of the member 200 at least in the region surrounding the member bore 204. The flange 324 may function as an axial indexing feature for controlling the axial position of the tubular body 302 within the member bore 204. In some examples, the offset bushing 300 may be axially positioned such that the flange underside is in bearing contact with a member side surface 202. In this regard, the body height 304 of the offset bushing 300 may be described as the distance between the flange underside and an opposite end of the tubular body 302. However, as indicated above, the offset bushing 300 may be provided without a flange 324 such that the body height 304 of the tubular body 302 may be defined by the distance between the opposing ends of the tubular body 302. As shown in FIG. 6, the body height 304 may be substantially equivalent to a thickness of the member 200 into which the offset bushing 300 may be installed. However, the body height 304 may be less than or greater than the thickness of the member.

Figure 7:
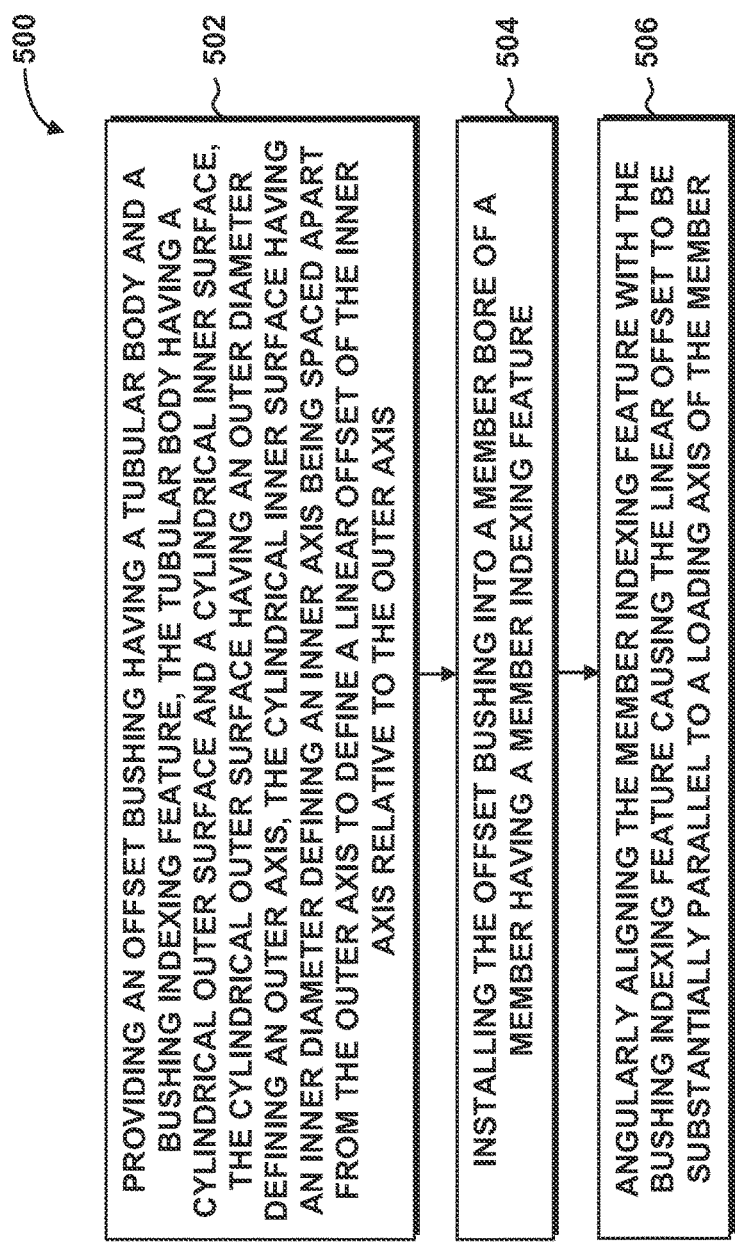
FIG. 7 is a flowchart having one or more operations that may be included in a method of installing an offset bushing in a structural member.

FIG. 7 is a flowchart of a method of installing an offset bushing 300 in a structural member 200. Step 502 of the method 500 of FIG. 7 may include providing at least one offset bushing 300 (FIG. 5) having a tubular body 302 (FIG. 5) having a cylindrical outer surface 306 (FIG. 5) and a cylindrical inner surface 312 (FIG. 5). The cylindrical outer surface 306 may have an outer diameter 308 (FIG. 5) defining an outer axis 310 (FIG. 5). The cylindrical inner surface 312 may have an inner diameter 314 (FIG. 5) defining an inner axis 316 (FIG. 5). The inner axis 316 may be spaced apart from outer axis 310 to define a linear offset 318 (FIG. 5), as described above. In addition, the offset bushing 300 may include a bushing indexing feature 328 (FIG. 5) that may be configured to engage with or correspond to a member indexing feature 210 (FIG. 5) that may be provided with the member 200.

Step 504 of the method 500 of FIG. 7 may include installing the offset bushing 300 in a member bore 204 of the member 200. In some examples, the member 200 may include two or more member bores 204, each of which may receive an offset bushing 300. For example, an end of a member 200 may have a clevis 130 configuration (e.g., see FIG. 2) including a pair of lugs 132 (see FIGS. 2 and 4). An offset bushing 300 may be installed in a bore 204 in each one of the lugs 132 of the clevis 130.

For examples where the offset bushing 300 includes a flange 324 (FIG. 2), the step of installing the offset bushing 300 may include axially inserting the offset bushing 300 into the member bore 204 until the flange underside comes into abutting contact with a member side surface 202 of the member 200 as shown in FIG. 2. As indicated above, contact between the flange underside and the member side surface 202 may provide a means for controlling the axial position of the offset bushing 300 within the member bore 204. The offset bushing 300 may be provided in a body height 304 (see FIG. 6) that may be substantially equivalent to a thickness of the member 200 (see FIG. 6). In some examples, the offset bushing 300 may be installed in a member bore 204 that may extend completely through the member 200. In other examples, the offset bushing 300 may be installed in a member bore 204 that may not extend completely through the member 200. Regardless of whether the member bore 204 is a through-bore extending completely through the member 200 or a non-through-bore extending only partially into the member 200, contact of the flange underside with the member side surface 202 may provide a means to control the depth of insertion of the offset bushing 300 into the member bore 204.

Step 506 of the method 500 of FIG. 7 may include angularly aligning (e.g., rotationally positioning) the member indexing feature 210 (FIG. 5) with the bushing indexing feature 328 (FIG. 5) causing the linear offset 318 (FIG. 5) to be oriented substantially parallel to a loading axis 252 (e.g., within 2 degrees) of the member 200. The step of angularly aligning the member indexing feature 210 with the bushing indexing feature 328 may include engaging or aligning a notch 330 (FIG. 5) formed in a flange 324 (FIG. 5) of the offset bushing 300 with a tab 212 on the member 200. The engagement or alignment of the tab 212 with the notch 330 may result in the linear offset 318 being aligned parallel with the loading axis 252. The step of angularly aligning the member indexing feature 210 with the bushing indexing feature 328 may also include orienting the offset bushing 300 within the member bore 204 such that the maximum wall thickness 322 (FIG. 6) is located on a portion of the member bore 204 subjected to the bearing force due to the larger of a tension limit load and a compression limit load that may be placed on the member 200.

As indicated above, the outer diameter 308 of the offset bushing 300 may be sized complementary to the member bore diameter 206. For example, the outer diameter 308 may be substantially equivalent to or slightly less than (e.g., 0.001 inch) the diameter of a member bore 204 such that a sliding fit is provided between the outer diameter 308 and the member bore 204. For applications involving loads of relatively high magnitude on the structural member 200, the outer diameter 308 may be slightly larger than the member bore diameter 206 to provide an interference fit within the member bore 204. For example, the outer diameter 308 may be several thousands of an inch (e.g., up to 0.005 inch) larger than the member bore diameter 206.

Installation of an interference fit offset bushing 300 into a member bore 204 may be performed by press fit, shrink fit, or any one of a variety of other means for temporarily contracting or reducing the size of the outer diameter 308 to less than the member bore diameter 206. The installation may also include orienting the bushing indexing feature 328 into engagement or alignment with the member indexing feature 210 such that the linear offset 318 is aligned with the loading axis 252, and then allowing the outer diameter 308 of the offset bushing 300 to expand back to its original size, thereby capturing the offset bushing 300 within the member bore 204. Alternatively, installation of the offset bushing 300 into the member bore 204 may be performed by temporarily increasing or expanding the member bore diameter 206, and then installing the offset bushing 300 and allowing the member bore 204 to contract back to its original size to thereby capture the offset bushing 300 within the member bore 204.

In an example of a shrink fitting operation, the offset bushing 300 may be provided with an outer diameter 308 that is slight larger (e.g., up to 0.002 inch) than the member bore diameter 206. The outer diameter 308 may be temporarily reduced such as below room temperature and/or below the temperature of the member 200 by immersing or dipping the offset bushing 300 in a cryogenic fluid such as liquid nitrogen for a period of time sufficient to cause the outer diameter 308 to reduce to a size less than the member bore diameter 206. While the outer diameter 308 is reduced, the offset bushing 300 may be inserted within the member bore 204 and angularly oriented such that the bushing indexing feature 328 is engaged or aligned with the member indexing feature 210 to align the linear offset 318 with the loading axis 252. The temperature of the offset bushing 300 may be allowed to increase (e.g., back up to room temperature) causing the outer diameter 308 to expand to its original size and thereby radially clamping the offset bushing 300 within the member bore 204. The radial clamping of the offset bushing 300 within the member bore 204 may prevent axial rotational movement and axial movement of the offset bushing 300 within the member bore 204.

The method of installing an offset bushing 300 in a structural member 200 may be implemented in any one of a variety of applications. For example, the method may include providing a series of offset bushings 300 (e.g., see FIGS. 11A-11C) each having a different linear offset 318 between an inner axis 316 and an outer axis 310 of a respective inner and an outer diameter 314, 308. The series of offset bushings 300 may allow for length adjustment of a structural member 200 at finite intervals. In this regard, a plurality of offset bushings 300 having different linear offsets 318 may be available to a technician to provide a range of center-to-center distances between opposing ends of a structural member 200 such that the structural member 200 may be connected to mating structure 400 at each end of the member 200. In one example, the process of selecting an offset bushing 300 from a series of offset bushings 300 may include determining the offset distance 134 (see FIG. 9) between the member bore axis 208 and the mating structure bore axis 404 of the mating structure 400 to which the member 200 is to be connected (see FIG. 9).

Figure 8:
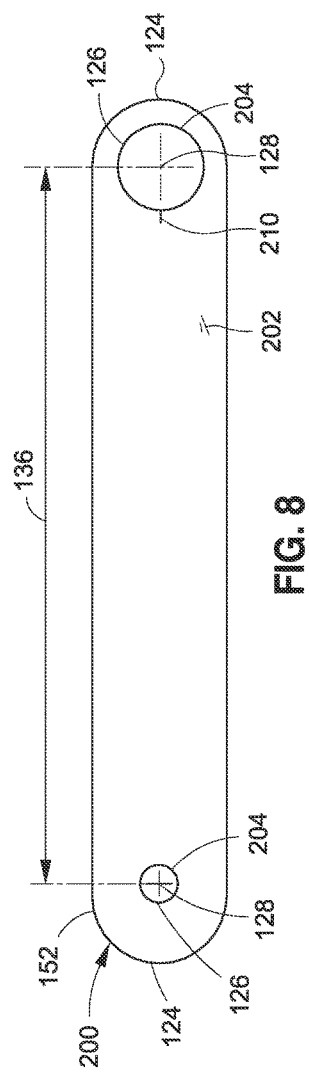
FIG. 8 is a top view of an example of a member configured as a link having opposing link ends and wherein the right-hand link end includes a member bore for receiving an offset bushing.

Referring to FIG. 8, in an example where the structural member 200 is a link 152 having opposing link ends 124 each having a link bore 126 with a center and a link bore axis 128, the method may include measuring the link center-to-center 136 distance from the link bore axis 128 at one link end 124 to the link bore axis 128 at an opposite link end 124. In FIG. 8, the left-hand link end 124 may have a relatively small link bore 126 diameter sized complementary to the diameter of a pin 412 (see FIG. 9) of the mating structure 400 (see FIG. 9) to which the left-hand link end 124 is to be connected. However, the left-hand link end 124 may be provided with a larger link bore 126 sized and configured to receive a concentric bushing (not shown). In still further embodiments, both the left-hand link end 124 and the right-hand link end 124 may be sized and configured to receive an offset bushing 300. The right-hand link end 124 shown in FIG. 8 includes a member bore 204 sized and configured to receive an offset bushing 300.

Figure 9:
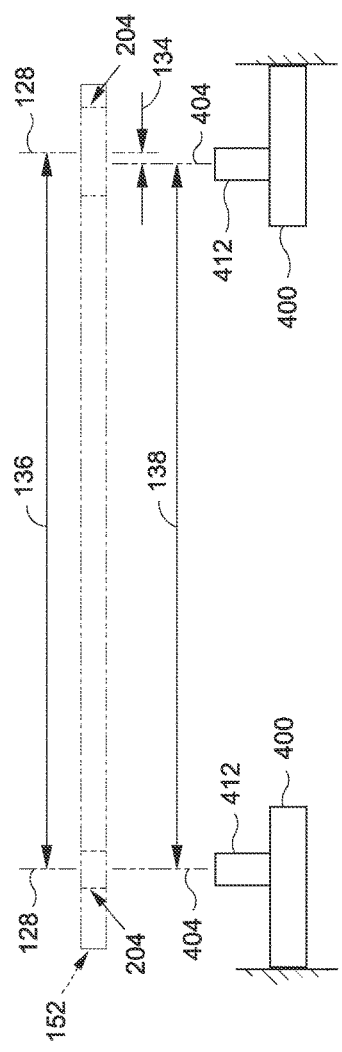
FIG. 9 is a side view of two mating structures that may be interconnected together by the link.
Figure 10:
FIG. 10 is a top view of the two mating structures that may be interconnected by the link.

Referring to FIG. 9, shown is a side view of two (2) mating structures 400 that may be interconnected together by a member 200 configured as a link 152. FIG. 10 is a top view of the two mating structures 400 that may be interconnected by the link 152. The method may further include measuring the center-to-center 138 distance between the bore axes 404 of the mating structures 400 to which the link 152 is to interconnect. The offset distance 134 may be determined by subtracting the center-to-center 138 distance between the axes 404 of the mating structure 400 from the center-to-center 136 distance of the link 152.

Referring to FIGS. 11A-11C, the method may further include selecting one offset bushing 300 from among a series of offset bushings 300 for installation into at least one member bore 204. The selected offset bushing 300 may have a linear offset that most closely approximates the offset distance 134 (FIG. 9) between the member bore axis 128 and the mating structure bore axis 404 of the mating structure bore 402 (see FIG. 6). In some examples, each offset bushing 300 in the series may have the same size, geometry and configuration including the same inner diameter 314, outer diameter 308, and bushing indexing feature 328 (see FIG. 5), and may differ by linear offset 318 (see FIG. 5). For example, FIGS. 11A-11C illustrate offset bushings 300 having a respective first linear offset 336, a second linear offset 338, and a third linear offset 340. In some examples, the difference in the linear offset of the offset bushings 300 in the series may vary by a constant increment. For example, the linear offset may vary in increments of 0.020 inch (e.g., ±0.003 inch), or the linear offset may vary in increments of 0.010 inch (e.g., ±0.001 inch). However, the variation in linear offset may be provided in any increment, without limitation. In other examples, the variation in linear offset may be non-uniform, or may include a combination of uniform variation in linear offset for some of the offset bushings 300 in the series, and non-uniform variation in linear offset for other offset bushings 300 in the series.

Referring to FIG. 12, after selecting an offset bushing 300, the method may include installing the selected offset bushing 300 into the member bore 204 in a manner such that the bushing indexing feature 328 (FIG. 14) is aligned with the member indexing feature 210 (FIG. 14) to cause the linear offset 318 (FIG. 14) to be aligned with a loading axis 252 (FIG. 5). For example, the offset bushings 300 shown in FIGS. 11A-11C may each include a bushing indexing feature 328 provided as a mark or a scribe line on an end face of each offset bushing 300. However, the offset bushing 300 may include any type of bushing indexing feature 328. The bushing indexing feature 328 may be provided in a flange 324 (FIG. 3) of the offset bushing 300. The member 200 may be provided with a complementary member indexing feature 210 (see FIG. 4). For example, the link 152 shown in FIG. 8 may include a mark or scribe line formed on the surface of the link 152 for alignment with the bushing indexing feature 328.

Referring to FIGS. 13-14, the method may include coupling the member 200 to the mating structure 400. For example, FIGS. 13-14 illustrate the link 152 interconnecting the mating structure 400 at each link end 124. The method may include inserting a pin 412 (e.g., a stud, a fastener, a rod, a cylinder) from the mating structure 400 into the inner diameter 314 (FIG. 15) of the offset bushing 300. In the example shown, the link ends 124 are mounted on a pin 412 extending upwardly from the left-hand mating structure 400 and the right-hand mating structure 400.

FIG. 15 is a sectional view taken along line 15 of FIG. 14 and illustrating a pin 412 of the right-hand mating structure 400 extending through the inner diameter 314 of the offset bushing 300 installed within the member bore 204 of the link 152. In any of the embodiments disclosed herein, a pin for coupling the member 200 to a mating structure 400 may be a fixed stud extending outwardly from a mating structure 400. Alternatively, a pin may be a through-pin or a fastener passing through a mating structure bore 402 (see FIG. 6) and into the inner diameter 314 of the offset bushing 300 to couple the member 200 to the mating structure 400.

Figure 16:
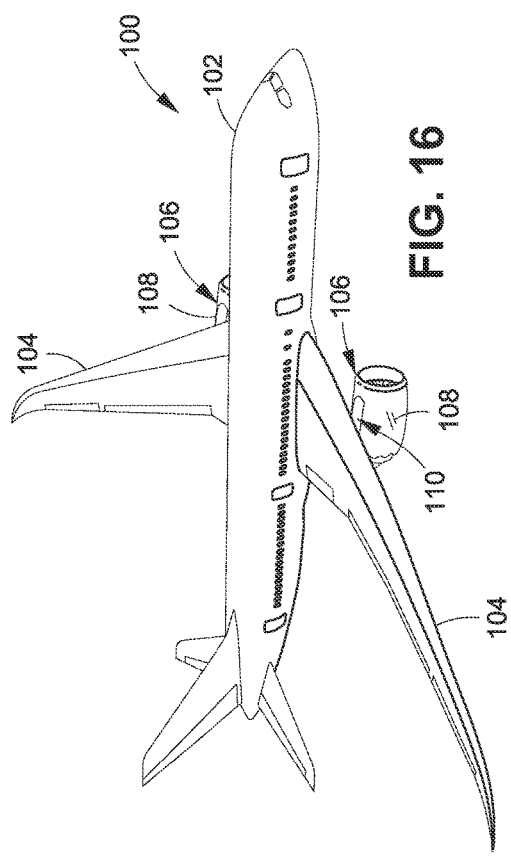
FIG. 16 is a perspective view of an aircraft.

FIG. 16, shown is an aircraft 100 having a fuselage 102 and wings 104 extending outwardly from the fuselage 102. The aircraft 100 may include one or more propulsion units 106 which may be configured as gas turbine engines. Each one of the gas turbine engines may include an engine nacelle 108, each of which may be supported by a wing 104 such as by using a nacelle strut 110.

Figure 17:
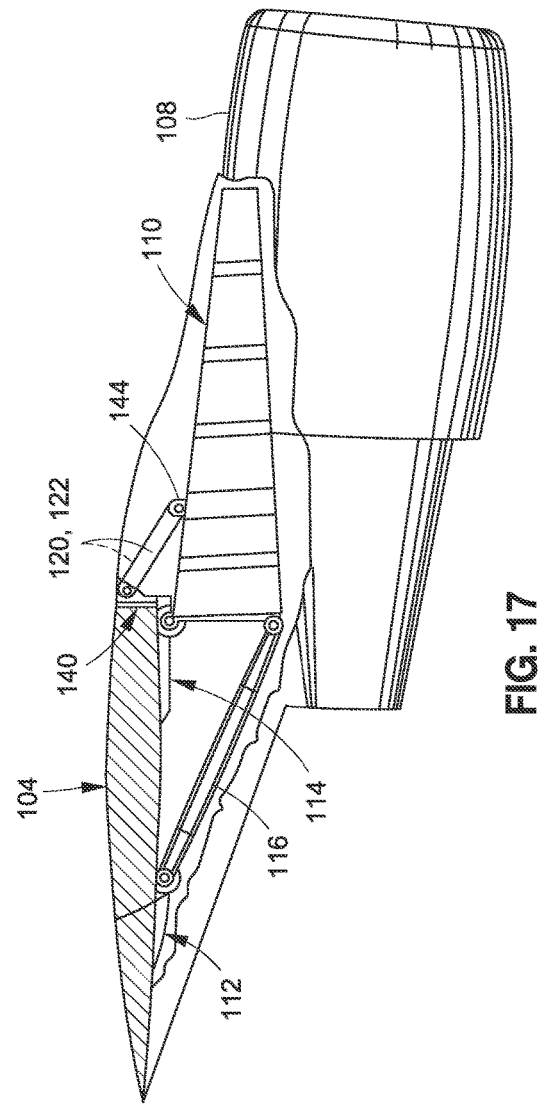
FIG. 17 is a side view of an example of an engine nacelle strut-to-wing installation.

FIG. 17 is a side view of an example of an engine nacelle strut-to-wing installation which may include a nacelle strut 110 (e.g., an engine pylon). The nacelle strut 110 may couple the engine nacelle 108 to the wing 104. The nacelle strut 110 may be coupled to one or more wing fittings using a diagonal brace 116 and a plurality of links 120, 122.

Figure 18:
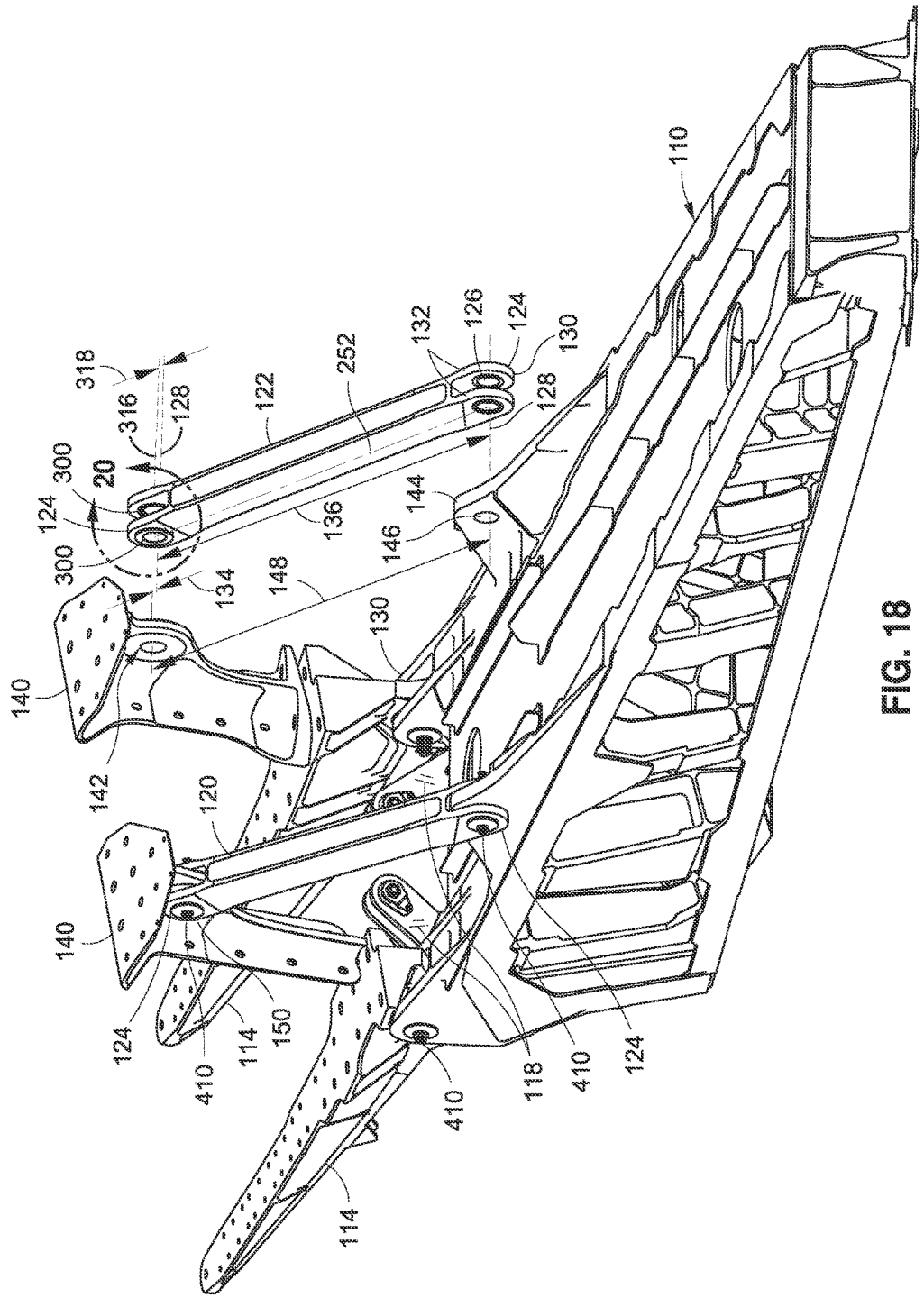
FIG. 18 is a perspective view of a nacelle strut coupled to a plurality of wing fittings by means of one or more links.

FIG. 18 shows a nacelle strut 110 coupled to a plurality of fittings 114, 140 by means of one or more links 120, 122. The nacelle strut 110 may include one or more strut fittings 144 each having a strut fitting bore 146. The wing 104 may include one or more forward nacelle support fittings 114 (e.g., see FIG. 17) mounted to a bottom surface (not shown) of the wing 104 (see FIG. 17). In addition, the wing 104 may include an inboard wing fitting 140 and an outboard wing fitting 140 which may be coupled to a spar (not shown) of the wing 104 (see FIG. 17). Each one of the wing fittings 140 may include a wing fitting bore 142. A clevis 130 configuration on the aft upper end of the nacelle strut 110 may be pinned to the forward nacelle support fittings 114 such as by using pin assemblies 410 (e.g., inboard and outboard aft upper spar pins), each of which may be configured similar to the pin assembly 410 shown in FIG. 24 and described below.

In FIG. 18, the links 120, 122 may have opposing link ends 124 with a link bore 126 in each link end 124. An inboard upper link 120 may initially be installed to connect a strut fitting 144 on the top of the nacelle strut 110 to a wing fitting 140 on a wing front spar (not shown). A diagonal brace 116 (FIG. 17) may be connected between a lower aft end of the nacelle strut 110 and an aft nacelle support fitting 112 (FIG. 17). A forward end of the diagonal brace 116 may be pinned to the aft end of the nacelle strut 110 by using a pin assembly 410 (e.g., FIG. 24). A vertically upward or downward preload (not shown) may be applied to the forward end of the nacelle strut 110 to pivot the nacelle strut 110 about the pin assemblies 410 as a means to adjust the distance between the lower aft end of the nacelle strut 110 and the aft nacelle support fitting 112 (see FIG. 17) to allow an aft end of the diagonal brace 116 to be pinned to the aft nacelle support fitting 112 (FIG. 17) such as by using a pin assembly 410. The nacelle strut fittings 144 on the upper portion of the nacelle strut 110 may be interconnected to the wing fittings 140 by an inboard upper link 120 and an outboard upper link 122.

Figure 19:
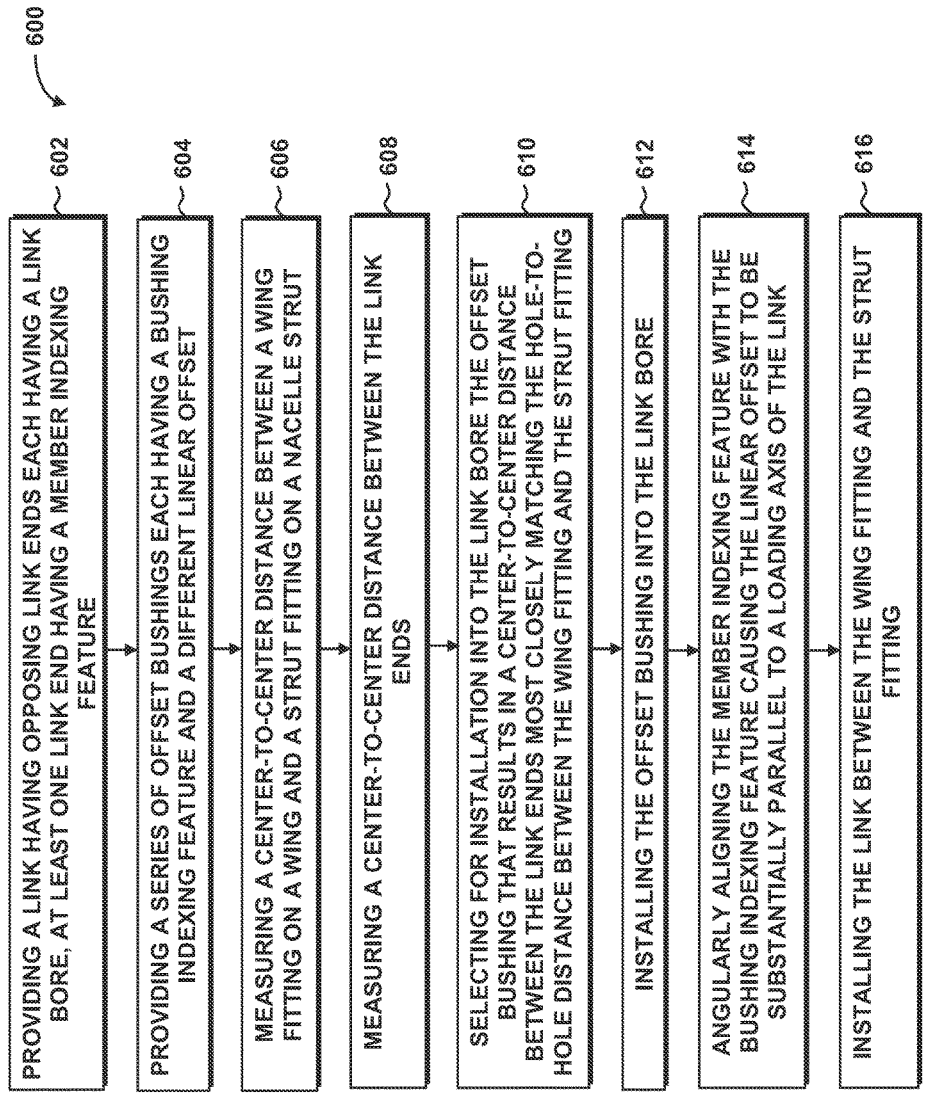
FIG. 19 is a flowchart having one or more operations that may be included in a method of performing an engine nacelle strut-to-wing installation.

FIG. 19 is a flowchart having one or more operations that may be included in a method 600 of performing an engine nacelle strut-to-wing installation for an aircraft 100 (see FIG. 16). Step 602 of the method 600 may include providing a link for coupling a wing fitting to a strut fitting. The link may have opposing link ends each having a link bore. For example, in FIG. 18, the outboard upper link 122 may be used to couple the wing fitting 140 to the strut fitting 144. Each link end 124 of the inboard upper link 120 and outboard upper link 122 may be provided in a clevis 130 arrangement. Each clevis 130 may have a pair of lugs 132 with a spacing between the lugs 132 to receive a wing fitting 140 or a strut fitting 144. The opposing link ends 124 of the inboard upper link 120 may include concentric bushings (not shown) in each lug 132 of the clevis 130. A concentric bushing may be described as a bushing having an inner diameter that is concentric to an outer diameter of the concentric bushing. The outer diameter of the concentric bushing may be sized complementary to the diameter of a bore in a lug of the clevis 130.

In FIG. 18, the lower link end 124 and the upper link end 124 of the inboard upper link 120 may each be coupled to the nacelle strut 110 using a pin assembly 410. A pair of side links 118 may be installed to interconnect a center wing fitting (not shown) with the aft end of the nacelle strut 110. The installation of the inboard upper link 120 and the diagonal brace 116 (see FIG. 17) results in a highly rigid system which precludes or prevents the use of preload on the forward end of the nacelle strut 110 to adjust the distance between the nacelle strut fitting 144 and the wing fitting 140 to allow for installation of the outboard upper link 122.

Referring to FIGS. 20-26, the connection of the outboard upper link 122 to the nacelle strut 110 and the outboard wing fitting 140 may require the use of one or more offset bushings 300. FIG. 20 shows an example of the upper link end 124 of the outboard upper link 122 of FIG. 18 and illustrating a pair of offset bushings 300 installed in a corresponding pair of lugs 132 of the link end 124. FIG. 21 shows the clevis 130 configuration of the link end 124 of FIG. 20 with the offset bushings 300 omitted. Also shown is an example of a member indexing feature 210 configured as a raised tab 212 that may be machined into or integrally formed with the outer side surface of each lug 132 of the clevis 130. FIGS. 22-23 illustrate an offset bushing 300 that may be installed in each lug 132 of the link end 124 and showing the bushing indexing feature 328 as a flat portion formed on the radial flange 324 for engaging or aligning with the tab 212 on each lug 132 of the link end 124 as shown in FIG. 21 to align the linear offset 318 (see FIGS. 5 and 6) with the loading on the outboard upper link 122.

Figures 25, 26:
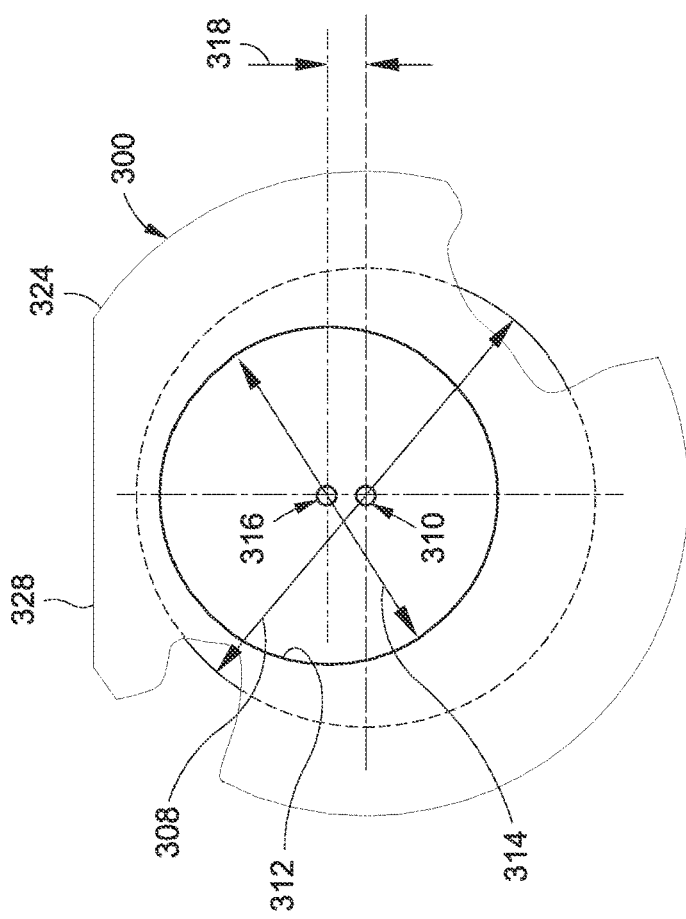
FIG. 25 is a plan view of an example of an offset bushing and illustrating the linear offset of the inner and outer diameters of the offset bushing.
FIG. 26 is a listing of different linear offsets of a series of offset bushings, one of which may be selected for insertion into a member bore of a structural member to facilitate the assembly of the member to the structure such as an engine nacelle strut-to-wing installation.

With reference again to FIG. 19, step 604 of the method 600 may include providing a series of offset bushings 300 (e.g., see FIGS. 11A-11C) each having a bushing indexing feature 328 and a different linear offset 336, 338, 380. FIG. 25 is a plan view of an offset bushing 300 showing the linear offset 318 between the inner diameter 314 and the outer diameter 308. As indicated above, the offset bushing 300 may include a bushing indexing feature 328 configured as a flat formed or machined on the flange 324 for engaging the member indexing feature 210 configured as a tab 212 on each one of the pair of lugs 132 of the upper link end 124 (see FIG. 21). Although not shown, the lower link end 124 (FIG. 18) of the outboard upper link 122 (FIG. 18) may be provided with a concentric bushing in each one of the lugs 132 of the clevis 130.

FIG. 26 is a listing of a series of nine (9) offset bushings 300 having different linear offsets 318 and which may be provided in a kit for the nacelle strut-to-wing installation. The -1 bushing listed in FIG. 26 has zero offset (0.000 inch)

indicating that the inner and outer diameters 314, 308 (FIG. 25) are concentric. The remaining offset bushings 300 in the series listed in FIG. 26 include four (4) pairs of bushings which are mirror images of one another. For example, the -2 and -3 pair of bushings have the same linear offset 318 (0.020 inch) and are mirror images of one another for installation into the opposing lugs 132 of the clevis 130 as shown in FIG. 20. Likewise the -4/-5 bushings, the -6/-7 bushings, and the -8/-9 bushings are respectively mirror images of one another for installation in the pair of lugs 132 of the outboard upper link 122.

Although FIG. 26 illustrates the linear offset 318 varying in uniform increments of 0.020 inch between each pair (e.g., -2/-3 vs. -4/-5) of mirror image offset bushings 300, a series of offset bushings 300 may have any increment of linear offsets 318, including a uniform increment of linear offsets 318, and/or a non-uniform increment of linear offsets 318. In addition, installation of offset bushings 300 into the opposing lug 132 of a clevis 130 fitting (see FIG. 20) is not limited to installation of mirror image offset bushings 300 having the same linear offset 318, and may instead include installing into one lug 132 of a clevis 130 an offset bushing 300 having a different linear offset 318 than the offset bushing 300 installed in the opposing lug 132 of the same clevis 130. Selection of a mirror image pair of offset bushing 300 from the series may require determining the offset distance 134 (e.g., see FIG. 18) between the center of the bore 142 in the wing fitting 140 and the center of the link bore 126 in the link end 124 of the outboard upper link 122 (see FIG. 18).

With reference again to FIG. 19, step 606 of the method 600 may include measuring a center-to-center distance 148 (FIG. 18) between the bore 142 in the wing fitting 140 and the bore 146 in the strut fitting 144 as shown in FIG. 19. Step 608 of the method 600 may include measuring the center-to-center distance 136 (FIG. 18) between the link bore axes 128 of the link ends 124 of the outboard upper link 122 as shown in FIG. 18. Step 610 of the method 600 may include selecting for installation into a link bore 126 an offset bushing 300 having a linear offset in the series that results in a center-to-center distance 136 between the link ends 124 of the outboard upper link 122 that most closely matches the center-to-center distance 148 between the wing fitting 140 and the strut fitting 144 (see FIG. 18). In this regard, the method may include subtracting the center to-center distance 148 between the wing fitting 140 and the strut fitting 144 from the center to-center distance 136 between the link ends 124 of the outboard upper link 122 to arrive at the offset distance 134 (see FIG. 18). An offset bushing 300 (e.g., a mirror image pair of offset bushings) may be selected from the series having a linear offset 318 that most closely matches the offset distance 134. For example, it may be determined that offset distance 134 is approximately 0.020 inch. The -2/-3 pair of mirror image offset bushings 300 have a linear offset 318 of 0.020 inch, and may therefore be selected for installation into the respective lugs 132 of the clevis 130 on the upper link end 124 of the outboard upper link 122.

Step 612 of the method 600 of FIG. 19 may include installing the selected offset bushings 300 into the link bore 126 in the lugs 132 of the upper link end 124 of the outboard upper link 122. As indicated above, the outer diameter 308 of the offset bushings 300 may be slightly larger than the member bore 204 diameter to provide an interference fit. The offset bushings 300 may be installed by press fit, shrink fit, or other suitable means. For example, the offset bushings 300 may be dipped or immersed in a cryogenic fluid such as liquid nitrogen to reduce the temperature the offset bushing 300 and thereby cause thermal contraction of the offset bushing 300 including contraction of the outer diameter 308. In the thermally contracted state, each offset bushing 300 may be axially inserted into the link bore 126 of a corresponding lug 132 of the outboard upper link 122.

Step 614 of the method 600 of FIG. 19 may include angularly aligning the member indexing feature 210 (FIG. 20) with the bushing indexing feature 328 (FIG. 20) while the offset bushing 300 is still thermally contracted. Alignment of the member indexing feature 210 with the bushing indexing feature 328 may result in the linear offset 318 being oriented substantially parallel to (e.g., within 2 degrees) a loading axis 252 of the outboard upper link 122. The temperature of the offset bushing 300 may then be allowed to increase which may result in a return of the outer diameter 308 to its original size, thereby capturing the offset bushing 300 within the link bore 126.

Step 616 of the method 600 of FIG. 19 may include installing the outboard upper link 122 (FIG. 18) between the wing fitting 140 (FIG. 18) and the strut fitting 144 (FIG. 18) such as by using a rod, a fastener, or a pin assembly 410 (FIG. 24). For example, as shown in FIG. 24, the method may include axially inserting a hollow pin 412 through each one of the offset bushing 300 and through the bore 142 (see FIG. 18) in the wing fitting 140 at the upper link end 124 of the outboard upper link 122. As shown in FIG. 24, the hollow pin 412 may be secured in position by end caps 414 on opposite sides of the pin 412. A fastener such as a bolt 416 may be inserted through the end caps 414 and through the hollow pin 412 and secured using a nut 418 or other mechanism.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. An offset bushing for a structural member, comprising:
 a tubular body having a cylindrical inner surface and a cylindrical outer surface, the cylindrical inner surface having an inner diameter defining an inner axis, the cylindrical outer surface having an outer diameter defining an outer axis, the inner axis being spaced apart from the outer axis to define a linear offset;
 a bushing indexing feature configured to align with a member indexing feature of the member when the offset bushing is installed in a member bore; and p1 wherein alignment of the bushing indexing feature with the member indexing feature causes the linear offset to be oriented substantially parallel to a loading axis of a load on the member.

2. The offset bushing of claim 1, wherein:
 the load on the member along the loading axis includes a tension limit load and a compression limit load;
 the tubular body having a minimum wall thickness and a maximum wall thickness; and
 the bushing indexing feature and the member indexing feature being configured such that when the offset bushing is installed in the member bore, the maximum wall thickness is located on a portion of the member bore that is subjected to a bearing force due to either the tension limit load or the compression limit load, whichever is larger.

3. The offset bushing of claim 1, further including:
a flange located on an end of the tubular body and having a flange underside configured to bear against a member side surface of the member.

4. The offset bushing of claim 3, wherein:
the flange is a radial flange having a flange diameter.

5. The offset bushing of claim 1, wherein:
the tubular body has a minimum wall thickness and a maximum wall thickness; and
the bushing indexing feature being located in radial alignment with one of the minimum wall thickness and the maximum wall thickness.

6. The offset bushing of claim 1, wherein:
the bushing indexing feature comprises a notch formed in a flange of the offset bushing and configured to engage a tab located on the member; and
engagement of the tab with the notch causes the linear offset to be aligned with the loading axis.

7. The offset bushing of claim 6, wherein:
the notch is wedge-shaped having notch sides defining an included angle of less than or equal to 30 degrees.

8. The offset bushing of claim 1, wherein:
the bushing indexing feature and the member indexing feature are configured to limit angular misalignment of the linear offset with the loading axis to less than 5 degrees.

9. A method of attaching a structural member to a mating structure, comprising:
providing an offset bushing having a tubular body including a cylindrical inner surface and a cylindrical outer surface, the cylindrical inner surface having an inner diameter defining an inner axis, the cylindrical outer surface having an outer diameter defining an outer axis, the inner axis being spaced apart from the outer axis to define a linear offset;
installing the offset bushing in a member bore of the member having a member indexing feature, the member bore having a member bore axis; and
angularly aligning the member indexing feature with a bushing indexing feature of the bushing causing the linear offset to be oriented substantially parallel to a loading axis of a load on the member.

10. The method of claim 9, wherein the member has a member side surface and the offset bushing has a flange located on an end of the tubular body, the flange having a flange underside, and wherein installing the offset bushing in the member bore includes:
placing the flange underside in abutting contact with the member side surface of the member.

11. The method of claim 10, wherein:
the flange is a radial flange having a flange diameter.

12. The method of claim 9, wherein angularly aligning the member indexing feature with the bushing indexing feature includes:
engaging a notch or a flat portion formed in a flange of the offset bushing with a tab on the member; and
aligning the linear offset with the loading axis as a result of engaging the tab with the notch or flat portion.

13. The method of claim 12, wherein:
the notch is wedge-shaped having notch sides defining an included angle of no greater than 30 degrees.

14. The method of claim 9, wherein:
the bushing indexing feature and the member indexing feature are configured to limit angular misalignment of the linear offset with the loading axis to less than 5 degrees.

15. The method of claim 9, wherein a load applied to the member along the loading axis includes a tension limit load and a compression limit load, the offset bushing having a minimum wall thickness and a maximum wall thickness, and wherein angularly aligning the member indexing feature with the bushing indexing feature includes:
orienting the offset bushing within the member bore such that the maximum wall thickness is located on a portion of the member bore subjected to a bearing force due to either the tension limit load or the compression limit load, whichever is larger.

16. The method of claim 9, wherein:
the tubular body has a minimum wall thickness and a maximum wall thickness; and
the bushing indexing feature being radially aligned with one of the minimum wall thickness and the maximum wall thickness.

17. The method of claim 9, wherein installing the offset bushing in the member bore comprises:
providing the offset bushing with an outer diameter larger than a member bore diameter of the member bore; and
shrink fitting the offset bushing into the member bore.

18. The method of claim 9, wherein the mating structure has a mating structure bore including a mating structure bore axis, and wherein providing the offset bushing and installing the offset bushing comprising:
providing a series of offset bushings each having a different linear offset between an inner axis and an outer axis of a respective inner and an outer diameter;
determining an offset distance between the member bore axis and the mating structure bore axis of the mating structure to be coupled to the member;
selecting for installation into the member bore the offset bushing in the series having a linear offset that most closely approximates the offset distance; and
installing a selected offset bushing into the member bore such that the bushing indexing feature is aligned with the member indexing feature to cause the linear offset to be aligned with the loading axis.

19. The method of claim 18, wherein:
the linear offset of any two of the offset bushings in the series differs by at least 0.010 inch.

20. A method of attaching a nacelle strut to a wing, comprising:
providing a link for coupling a wing fitting of the wing to a strut fitting of the nacelle strut, the link having opposing link ends each having a link bore;
providing a series of offset bushings each having a tubular body having a cylindrical inner surface and a cylindrical outer surface, the cylindrical inner surface having an inner diameter defining an inner axis, the cylindrical outer surface having an outer diameter defining an outer axis, the inner axis being spaced apart from the outer axis to define a linear offset, the series of offset bushings having different linear offsets between the inner axis and the outer axis of the respective inner diameter and the outer diameter;
measuring a center-to-center distance between the wing fitting on the wing and the strut fitting on the nacelle strut;
measuring a center-to-center distance between the link ends;
selecting for installation into one of the link bores an offset bushing having a linear offset that results in a center-to-center distance between the link ends that most closely matches the center-to-center distance between the wing fitting and the strut fitting;

installing the selected offset bushing into at least one link bore of the link;

angularly aligning a member indexing feature on the link with a bushing indexing feature on the selected offset bushing causing the linear offset to be oriented substantially parallel to a loading axis of a load on the link; and installing the link to interconnect the wing fitting and the strut fitting.

* * * * *